(12) United States Patent
Yamamoto et al.

(10) Patent No.: US 8,044,153 B2
(45) Date of Patent: Oct. 25, 2011

(54) CURABLE SILICONE COMPOSITION

(75) Inventors: Shinichi Yamamoto, Chiba (JP); Tomoko Kato, Chiba (JP); Hiroji Enami, Chiba (JP); Yoshitsugu Morita, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 43 days.

(21) Appl. No.: 12/093,053

(22) PCT Filed: Nov. 8, 2006

(86) PCT No.: PCT/JP2006/322701
§ 371 (c)(1),
(2), (4) Date: May 8, 2008

(87) PCT Pub. No.: WO2007/055395
PCT Pub. Date: May 18, 2007

(65) Prior Publication Data
US 2009/0118441 A1      May 7, 2009

(30) Foreign Application Priority Data
Nov. 9, 2005   (JP) ................................. 2005-324510

(51) Int. Cl.
*C08G 77/12*   (2006.01)
*C08G 77/20*   (2006.01)
*C08L 83/05*   (2006.01)
*C08L 83/07*   (2006.01)

(52) U.S. Cl. ................ 525/478; 528/31; 528/32; 528/33

(58) Field of Classification Search ............... 525/31–35; 528/478
See application file for complete search history.

(56) References Cited

U.S. PATENT DOCUMENTS

| | | | | |
|---|---|---|---|---|
| 5,235,004 | A | * 8/1993 | Kobayashi et al. | 525/477 |
| 5,674,966 | A | * 10/1997 | McDermott et al. | 528/32 |
| 6,124,407 | A | * 9/2000 | Lee et al. | 525/478 |
| 6,623,864 | B1 | 9/2003 | Sweet et al. | |

FOREIGN PATENT DOCUMENTS

| | | |
|---|---|---|
| EP | 0997498 A1 | 5/2000 |
| JP | 07053872 A | 2/1995 |
| JP | 2000-198930 A | 7/2000 |
| JP | 2001-002922 A | 1/2001 |
| WO | WO 2006-001458 A2 | 1/2006 |
| WO | WO 2006-040964 A1 | 4/2006 |
| WO | WO 2006-070903 A1 | 7/2006 |
| WO | WO 2006/135036 A1 | 12/2006 |
| WO | WO 2007-026727 A1 | 3/2007 |
| WO | WO 2007-052845 A1 | 5/2007 |

OTHER PUBLICATIONS

English language translation for JP 07053872 extracted from PAJ database, dated Jan. 20, 2009, 40 pages.
English language translation for JP 2000-198930 extracted from PAJ database, dated Jan. 20, 2009, 43 pages.
English language translation for JP 2001-002922 extracted from PAJ database, dated Jan. 20, 2009, 50 pages.
PCT International Search Report for PCT/JP2005/011864, dated Jan. 20, 2006, 5 pages.
PCT International Search Report for PCT/JP2005/018405, dated Mar. 22, 2006, 6 pages.
PCT International Search Report for PCT/JP2005/024196, dated Mar. 20, 2006, 3 pages.
PCT International Search Report for PCT/JP2006/312088, dated Sep. 22, 2006, 3 pages.
PCT International Search Report for PCT/JP2006/317033, dated Nov. 27, 2006, 3 pages.
PCT International Search Report for PCT/JP2006/322425, dated Feb. 20, 2007, 3 pages.
PCT International Search Report for PCT/JP2006/322701, dated Feb. 15, 2007, 3 pages.

* cited by examiner

*Primary Examiner* — Randy Gulakowski
*Assistant Examiner* — Mike M Dollinger
(74) *Attorney, Agent, or Firm* — Howard & Howard Attorneys PLLC

(57) ABSTRACT

A curable silicone composition comprising at least the following components: (A) a diorganopolysiloxane having in one molecule at least two alkenyl groups; (B) at least two resin-like organopolysiloxanes that have different mass-average molecular weights as reduced into standard polystyrene measured gel permeation chromatography and that are composed of $SiO_{4/2}$ units, $R^1_2R^2SiO_{1/2}$ units, and $R^1_3SiO_{1/2}$ units, wherein $R^1$ is an optionally substituted univalent hydrocarbon group that is free of aliphatic unsaturated bonds and $R^2$ is an alkenyl group; (C) an organopolysiloxane that contains in one molecule at least two silicon-bonded hydrogen atoms; and (D) a hydrosilylation catalyst; possesses excellent flowability and filling ability and that can be prepared without extreme viscosity even if the composition contains resin-like organopolysiloxanes required to form a cured silicone body of appropriate strength and hardness.

7 Claims, No Drawings

US 8,044,153 B2

CURABLE SILICONE COMPOSITION

RELATED APPLICATIONS

This application claims priority to and all the advantages of International Patent Application No. PCT/JP2006/322701, filed on Nov. 8, 2006, which claims priority to Japanese Patent Application No. JP2005-324510, filed on Nov. 9, 2005.

TECHNICAL FIELD

The present invention relates to a curable silicone composition, in particular, to a curable silicone composition that contains resin-like organopolysiloxanes.

BACKGROUND ART

Curable silicone compositions that contain a resin-like organopolysiloxane are known. For example, Japanese Unexamined Patent Application Publication (hereinafter referred to as "Kokai") H07-53872 discloses a curable silicone composition that contains a diorganopolysiloxane having both molecular terminals capped with vinyl groups, a resin-like organopolysiloxane that contains alkenyl groups, an organohydrogenpolysiloxane, and a platinum-type catalyst. Kokai 2000-198930 discloses a curable silicone composition that contains a diorganopolysiloxane having at least two alkenyl groups in one molecule, a resin-like organopolysiloxane that contains alkenyl groups, an organohydrogenpolysiloxane, and a platinum-type catalyst. Furthermore, Kokai 2001-2922 discloses a curable silicone composition that contains a diorganopolysiloxane having at least two alkenyl groups in one molecule, a resin-like organopolysiloxane that contains alkenyl groups, an organohydrogenpolysiloxane, and a platinum-type catalyst.

When the amount of resin-like organopolysiloxanes contained in such curable silicone compositions is increased, it becomes possible to obtain a cured silicone body with appropriate hardness, reduced surface tackiness, and sufficient strength. However, the compositions themselves are extremely viscous and therefore have low flowability and filling ability.

It is an object of the present invention to provide a curable silicone composition that possesses excellent flowability and filling ability and that can be prepared without exhibiting an extreme viscosity even if the composition contains resin-like organopolysiloxanes required to form a cured silicone body of appropriate strength and hardness.

DISCLOSURE OF INVENTION

The present invention provides a curable silicone composition comprising at least the following components:

(A) a diorganopolysiloxane having in one molecule at least two alkenyl groups;

(B) at least two resin-like organopolysiloxanes that have different mass-average molecular weights as reduced into standard polystyrene measured by gel permeation chromatography and that are composed of $SiO_{4/2}$ units, $R^1_2R^2SiO_{1/2}$ units, and $R^1_3SiO_{1/2}$ units, wherein $R^1$ is an optionally substituted univalent hydrocarbon group that is free of aliphatic unsaturated bonds and $R^2$ is an alkenyl group, and wherein this component is used in the amount of 10 to 100 parts by mass per 100 parts by mass of component (A);

(C) an organopolysiloxane that contains in one molecule at least two silicon-bonded hydrogen atoms, wherein the silicon-bonded hydrogen atoms contained in this component are used in the amount of 0.1 to 10 moles per one mole of all alkenyl groups contained in components (A) and (B); and (D) a hydrosilylation catalyst in a catalytic quantity.

EFFECTS OF INVENTION

The curable silicone composition of the invention possesses excellent flowability and filling ability and can be prepared without exhibiting an extreme viscosity even if the composition contains resin-like organopolysiloxanes required to form a cured silicone body of appropriate strength and hardness.

DETAILED DESCRIPTION OF THE INVENTION

The diorganopolysiloxane of component (A), which contains at least two alkenyl groups in one molecule, is one of the main components of the composition. Component (A) may have essentially a linear molecular structure, but it may also be partially branched. The alkenyl groups of component (A) are represented by vinyl, allyl, isopropenyl, butenyl, hexenyl, and cyclohexenyl groups, of which vinyl groups are preferable. There are no special restrictions with regard to bonding positions of the alkenyl groups. For example, these groups may be located on molecular terminals and/or on side chains. The silicon-bonded groups other than alkenyl groups of component (A) are represented by methyl, ethyl, propyl, or similar alkyl groups; phenyl, tolyl, xylyl, or similar aryl groups; benzyl, phenethyl, or similar aralkyl groups; 3-chloropropyl, 3,3,3-trifluoropropyl, or similar halogenated alkyl groups. Most preferable are methyl and phenyl groups. There are no special restrictions with regard to the viscosity of component (A), but it is recommended that viscosity range from 100 to 1,000,000 mPa·s, preferably 100 to 100,000 mPa·s, at 25° C.

Specific examples of the diorganopolysiloxanes of component (A) are the following: a dimethylpolysiloxane capped at both molecular terminals with dimethylvinylsiloxy groups, a copolymer of methylvinylsiloxane and dimethylsiloxane capped at both molecular terminals with dimethylvinylsiloxy, a copolymer of methylphenylsiloxane and dimethylsiloxane capped at both molecular terminals with dimethylvinylsiloxy, methylvinylpolysiloxane capped at both molecular terminals with trimethylsiloxy, a copolymer of methylvinylsiloxane and a dimethylsiloxane capped at both molecular terminals with trimethylsiloxy, or a mixture of two or more of the above.

The resin-like organopolysiloxanes of component (B) are used in the composition for imparting appropriate strength and hardness to a cured body of the composition. These organopolysiloxanes are composed of $SiO_{4/2}$ units, $R^1_2R^2SiO_{1/2}$ units, and $R^1_3SiO_{1/2}$ units. In these formulae, $R^1$ is an optionally substituted univalent hydrocarbon group that is free of aliphatic unsaturated bonds and is exemplified by methyl, ethyl, propyl, or other alkyl groups; phenyl, tolyl, xylyl, or other aryl groups; benzyl, phenethyl, or other aralkyl groups; 3-chloropropyl, 3,3,3-trifluoropropyl, or other halogenated alkyl groups; most preferable are methyl and phenyl groups. In the above formula, $R^2$ designates an alkenyl group such as vinyl, allyl, isopropenyl, butenyl, hexenyl, or cyclohexenyl. Most preferable is the vinyl group.

In the composition of the invention, component (B) is composed of at least two resin-like organopolysiloxanes that have different mass-average molecular weights as reduced into standard polystyrene measured by gel permeation chromatography. It is recommended that component (B) be composed of at least two types of resin-like organopolysiloxanes having a difference of at least 1,000, preferably of at least 1,500, and most preferably of at least 2,000, between their mass-average molecular weights. When component (B) is composed of two different resin-like organopolysiloxanes, there are no special restrictions with regard to the proportions in which the high-molecular-weight constituent and the low-molecular-weight constituent are used. It is recommended that the mass ratio of these constituents (i.e., of the high-molecular-weight constituent to the low-molecular-weight constituent) be in the range of (50:50) to (10:90). There are no special restrictions with regard to the mass-average molecular weight of component (B) as reduced into standard polystyrene measured by gel permeation chromatography, but, in general, the value of this characteristic should be in the range of 100 to 10,000.

In the composition of the invention, component (B) is used in an amount of 10 to 100 parts by mass, preferably 40 to 100 parts by mass, per 100 parts by mass of component (A). If component (B) is contained in an amount less than the lower recommended limit, this will reduce hardness in the cured body obtained from the composition, and the surface of the cured body will develop tackiness. If, on the other hand, the content of component (B) exceeds the upper recommended limit, this will either increase viscosity of the obtained composition or will cause excess hardness in the cured body.

The organopolysiloxane of component (C) is a cross-linking agent. This component contains at least two silicon-bonded hydrogen atoms in one molecule. Component (C) may have a linear, partially branched linear, branched, cyclic, or dendritic molecular structure. Most preferable are linear, partially branched linear, and dendritic molecular structures. There are no special restrictions with regard to the bonding positions of the silicon-bonded hydrogen atoms in component (C), and these positions may be on molecular terminals and/or on side chains. Silicon-bonded groups other than the aforementioned silicon-bonded hydrogen atoms of component (C) are exemplified by methyl, ethyl, propyl, or other alkyl groups; phenyl, tolyl, xylyl, or other aryl groups; benzyl, phenethyl, or other aralkyl groups; 3-chloropropyl, 3,3,3-trifluoropropyl, or other halogenated alkyl groups. Most preferable are methyl and phenyl groups. There are no restrictions with regard to the viscosity of component (C), but it is recommended that viscosity range from 1 to 10,000 mPa·s, preferably 1 to 1,000 mPa·s at 25° C.

Specific examples of the organopolysiloxane of component (C) are the following: a dimethylpolysiloxane capped at both molecular terminals with dimethylhydrogensiloxy groups, a copolymer of methylhydrogensiloxane and dimethylsiloxane capped at both molecular terminals with dimethylhydrogensiloxy groups, a methylhydrogenpolysiloxane capped at both molecular terminals with trimethylsiloxy groups, a copolymer of methylhydrogensiloxane and dimethylsiloxane capped at both molecular terminals with trimethylsiloxy groups, an organopolysiloxane composed of $SiO_{4/2}$ units and $(CH_3)_2HSiO_{1/2}$ units, or an organopolysiloxane composed of $SiO_{4/2}$ units, $(CH_3)_2HSiO_{1/2}$ units, and $(CH_3)_3SiO_{1/2}$ units. These organopolysiloxanes can be used in combinations of two or more.

In the composition of the invention, component (C) is used in a quantity such that the silicon-bonded hydrogen atoms contained in this component range from 0.1 to 10 moles, preferably 0.5 to 5 moles, per one mole of the sum of alkenyl groups contained in components (A) and (B). If the content of component (C) is below the lower recommended limit, the obtained composition will not cure sufficiently; if, on the contrary, the content of component (C) exceeds the upper recommended limit, this will impair heat-resistant properties of the obtained cured body.

The hydrosilylation catalyst of component (D) is a catalyst used to accelerate curing of the composition. This catalyst is exemplified by a platinum-type catalyst, a rhodium-type catalyst, and a palladium-type catalyst, of which the platinum-type catalyst is preferable. Such platinum-type catalyst is exemplified by fine platinum powder, platinum black, fine platinum powder on a silica carrier, platinum on activated carbon, chloroplatinic acid, an alcohol solution of a chloroplatinic acid, a platinum-olefin complex, a platinum-alkenylsiloxane complex, or a similar platinum-type compound.

In the composition of the invention, component (D) should be used in a catalytic quantity. More specifically, it is recommended to use the catalyst in an amount such that, in terms of mass units, metallic platinum is contained in the catalyst in the amount of 0.01 to 1,000 ppm. If component (D) is used in an amount less than the lower recommended limit, the catalyst will not accelerate curing of the composition to a sufficient degree; if, on the contrary, component (D) is contained in an amount exceeding the upper recommended limit, this will not accelerate curing by contraries but rather will subject the cured body to change in color.

The composition of the invention may contain other arbitrary components that can be used, e.g., for adjusting curing speed of the composition. Examples of such arbitrary components are the following: 2-methyl-3-butyn-2-ol, 3,5-dimethyl-1-hexyn-3-ol, phenylbutynol, or similar alkyne alcohols; 3-methyl-3-penten-1-yne, 3,5-dimethyl-3-hexen-1-yne, or similar enyne compounds; 1,3,5,7-tetramethyl-1,3,5,7-tetravinylcyclotetrasiloxane, 1,3,5,7-tetramethyl-1,3,5,7-tetrahexenylcyclotetrasiloxane, benzotriazole, or other reaction inhibitors. There are no special restrictions with regard to the amounts in which the reaction inhibitors should be used, but, in general, it is recommended, in terms of mass units, to use the reaction inhibitors in the amount of 10 to 1,000 ppm.

If it is necessary to improve the adhesive properties of a cured body obtained from the composition of the invention, the composition may be combined with an adhesion-imparting agent. Such an adhesion-imparting agent may comprise an organosilicon compound having at least one silicon-bonded alkoxy group in one molecule. Such an alkoxy group is exemplified by methoxy, ethoxy, propoxy, butoxy, or a methoxyethoxy group. Most preferable is the methoxy group. Groups other than the aforementioned alkoxy group bonded to silicon atoms of the aforementioned organosilicon compound are represented by optionally substituted univalent hydrocarbon groups such as methyl, ethyl, propyl, butyl, pentyl, hexyl, heptyl, or similar alkyl groups; vinyl, allyl, butenyl, pentenyl, hexenyl, or similar alkenyl groups; phenyl, tolyl, xylyl, naphthyl, or similar aryl groups; benzyl, phenethyl, or similar aralkyl groups; chloromethyl, 3-chloropropyl, 3,3,3-trifluoropropyl, or similar halogenated alkyl groups; epoxy-containing univalent organic groups such as 3-glycidoxypropyl, 4-glycidoxybutyl, or similar glycidoxyalkyl groups; 2-(3,4-epoxycyclohexyl)ethyl, 3-(3,4-epoxycyclohexyl) propyl, or similar epoxycyclohexylalkyl groups; 4-oxiranylbutyl, 8-oxiranyloctyl, or similar oxiranylalkyl groups; acryl-containing univalent organic groups such as 3-methacryloxypropyl groups; or hydrogen atoms. From the viewpoint of improved adhesion to various substrates, most preferable are the organosilicon compounds that contain in one molecule at least one epoxy-containing group. Such organosilicon compounds are exemplified by silane and siloxane compounds. These compounds may have linear, partially branched linear, branched, cyclic, or net-like molecular structures, preferable of which are linear, branched, and net-like molecular structures. Specific examples of the aforementioned organosilicon compounds are the following: 3-glycidoxypropyltrimethoxysilane, 2-(3,4-epoxycyclohexyl)ethyltrimethoxysilane, 3-methacryloxypropyltrimethoxysilane, or similar silanes; siloxane compounds that contain in one molecule at least one silicon-bonded alkenyl group or silicon-bonded hydrogen atom and at least one silicon-bonded alkoxy group; a mixture of a silane compound or a siloxane compound having at least one silicon-bonded alkoxy group with a siloxane compound that contains in one molecule at least one silicon-bonded hydroxy group and a silicon-bonded alkenyl group; a siloxane compound represented by the following formula:

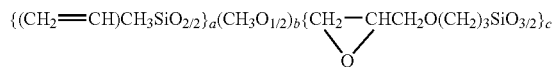

(where "a", "b", and "c" are positive numbers); and a siloxane compound of the following formula:

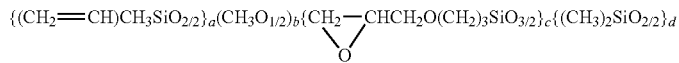

(where "a", "b", "c", and "d" are positive numbers).

It is preferable that the above-mentioned adhesion-imparting agents be in the form of a low-viscosity liquid. There are no special restrictions with regard to the viscosity of such liquids, but it is recommended that the viscosity range from 1 to 500 mPa·s. There are no restrictions with regard to the amounts in which these adhesion-imparting agents can be used, but it is recommended to add these agents in the amount of 0.01 to 10 parts by mass per 100 parts by mass of component (A).

The curable silicone composition of the invention described above is characterized by excellent flowability and filling ability, and its viscosity at 25° C. is not limited by application conditions, but, in general, it is recommended that viscosity range from 100 to 500,000 mPa·s, preferably 100 to 100,000 mPa·s.

EXAMPLES

The curable silicone composition of the present invention will be described in more detail with reference to Application and Comparative Examples. In these examples, the values of viscosity correspond to 25° C.

Application Example 1

A curable silicone composition was prepared by uniformly mixing the following components: 40 parts by mass of a dimethylpolysiloxane capped at both molecular terminals with dimethylvinylsiloxy groups and having a viscosity of 40 Pa·s; 60 parts by mass of dimethylpolysiloxane capped at both molecular terminals with dimethylvinylsiloxy groups and having a viscosity of 2 Pa·s; 47 parts by mass of a resin-like organopolysiloxane represented by the following average unit formula:

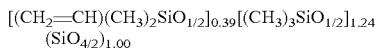

and having a mass-average molecular weight of 1,300 as reduced into standard polystyrene measured by gel permeation chromatography; 23 parts by mass of a resin-like organopolysiloxane represented by the following average unit formula:

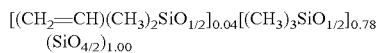

and having a mass-average molecular weight of 4,600 as reduced into standard polystyrene measured by gel permeation chromatography; 12.3 parts by mass of a methylhydrogenpolysiloxane capped at both molecular terminals with trimethylsiloxy groups and having a viscosity of 20 mPa·s (wherein 1.75 moles of silicon-bonded hydrogen atoms of this component correspond to one mole of all vinyl groups contained in the aforementioned dimethylpolysiloxanes); one part by mass of an organosilicon compound which is used as an adhesion accelerator and is represented by the following average unit formula:

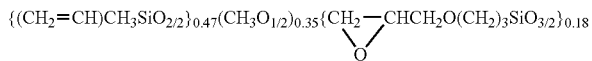

and phenylbutynol for use as a reaction inhibitor (which in terms of mass units is contained in the amount of 50 ppm per weight of the composition); and a platinum-type catalyst (which in terms of mass units is contained in the amount of 5 ppm per weight of the composition).

Viscosity of the obtained curable silicone composition was measured, and the results are shown in Table 1. Furthermore, the obtained curable silicone composition was cured for one hour at 150° C., whereby a rubber-like cured silicone body was obtained. The hardness of the cured silicone body was measured by a Type-A durometer as specified by JIS K 6253-1997 ("Hardness Testing Methods for Rubber, Vulcanized or Thermoplastic"). Tensile strength was measured according to JIS K 6251-1993 ("Tensile Testing Methods for Vulcanized Rubber"). Measurement results are shown in Table 1.

Application Example 2

A curable silicone composition was prepared by uniformly mixing the following components: 10 parts by mass of a dimethylpolysiloxane capped at both molecular terminals with dimethylvinylsiloxy groups and having a viscosity of 12 Pa·s; 90 parts by mass of dimethylpolysiloxane capped at both molecular terminals with dimethylvinylsiloxy groups and having a viscosity of 2 Pa·s; 41 parts by mass of a resin-like organopolysiloxane represented by the following average unit formula:

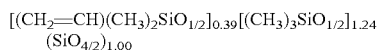

and having a mass average molecular weight of 1,300 as reduced into standard polystyrene measured by gel permeation chromatography; 23 parts by mass of a resin-like orga nopolysiloxane represented by the following average unit formula:

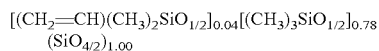

and having a mass average molecular weight of 4,600 as reduced into standard polystyrene measured by gel permeation chromatography; 10 parts by mass of a methylhydrogenpolysiloxane capped at both molecular terminals with trimethylsiloxy groups and having a viscosity of 20 mPa·s (wherein 1.47 moles of silicon-bonded hydrogen atoms of this component correspond to one mole of all vinyl groups contained in the aforementioned polysiloxanes); one part by mass of an organosilicon compound which is used as an adhesion accelerator and is represented by the following average unit formula:

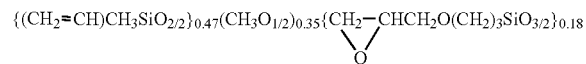

and phenylbutynol for use as a reaction inhibitor (which in terms of mass units is contained in the amount of 50 ppm per weight of the composition); and a platinum-type catalyst (which in terms of mass units is contained in the amount of 5 ppm per weight of the composition).

Viscosity of the obtained curable silicone composition was measured, and the results are shown in Table 1. Furthermore, the obtained curable silicone composition was cured for one hour at 150° C., whereby a rubber-like cured silicone body was obtained. The hardness and tensile strength of the obtained cured silicone body were measured by the same methods as in Application Example 1. Measurement results are shown in Table 1.

Comparative Example 1

A curable silicone composition was prepared by uniformly mixing the following components: 40 parts by mass of a dimethylpolysiloxane capped at both molecular terminals with dimethylvinylsiloxy groups and having a viscosity of 40 Pa·s; 60 parts by mass of a dimethylpolysiloxane capped at both molecular terminals with dimethylvinylsiloxy groups and having a viscosity of 2 Pa·s; 70 parts by mass of a resin-like organopolysiloxane represented by the following average unit formula:

$$\{(CH_2=CH)(CH_3)_2SiO_{1/2}\}_{0.39}[(CH_3)_3SiO_{1/2}]_{1.24}(SiO_{4/2})_{1.00}$$

and having a mass average molecular weight of 1,300 as reduced into standard polystyrene measured by gel permeation chromatography; 14.8 parts by mass of a methylhydrogenpolysiloxane capped at both molecular terminals with trimethylsiloxy groups and having a viscosity of 20 mPa·s (wherein 1.75 moles of silicon-bonded hydrogen atoms of this component correspond to one mole of all vinyl groups contained in the aforementioned polysiloxanes); one part by mass of an organosilicon compound which is used as an adhesion accelerator and is represented by the following average unit formula:

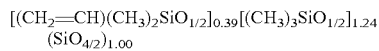

and phenylbutynol for use as a reaction inhibitor (which in terms of mass units is contained in the amount of 50 ppm per weight of the composition); and a platinum-type catalyst (which in terms of mass units is contained in the amount of 5 ppm per weight of the composition).

Viscosity of the obtained curable silicone composition was measured, and the results are shown in Table 1. Furthermore, the obtained curable silicone composition was cured for one hour at 150° C., whereby a rubber-like cured silicone body was obtained. The hardness and tensile strength of the obtained cured silicone body were measured by the same methods as in Application Example 1. Measurement results are shown in Table 1.

Comparative Example 2

A curable silicone composition was prepared by uniformly mixing the following components: 40 parts by mass of a dimethylpolysiloxane capped at both molecular terminals with dimethylvinylsiloxy groups and having a viscosity of 40 Pa·s; 60 parts by mass of a dimethylpolysiloxane capped at both molecular terminals with dimethylvinylsiloxy groups and having a viscosity of 2 Pa·s; 70 parts by mass of a resin-like organopolysiloxane represented by the following average unit formula:

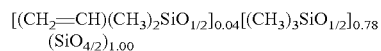

and having a mass-average molecular weight of 4,600 as reduced into standard polystyrene measured by gel permeation chromatography; 7.1 parts by mass of a methylhydrogenpolysiloxane capped at both molecular terminals with trimethylsiloxy groups and having a viscosity of 20 mPa·s (wherein 1.75 moles of silicon-bonded hydrogen atoms of this component correspond to one mole of all vinyl groups contained in the aforementioned polysiloxanes); one part by mass of an organosilicon compound which is used as an adhesion accelerator and is represented by the following average unit formula:

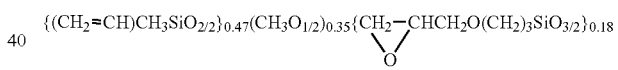

and phenylbutynol for use as a reaction inhibitor (which in terms of mass units is contained in the amount of 50 ppm per weight of the composition); and a platinum-type catalyst (which in terms of mass units is contained in the amount of 5 ppm per weight of the composition).

Viscosity of the obtained curable silicone composition was measured, and the results are shown in Table 1. Furthermore, the obtained curable silicone composition was cured for one hour at 150° C., whereby a rubber-like cured silicone body was obtained. The hardness and tensile strength of the obtained cured silicone body were measured by the same methods as in Application Example 1. Measurement results are shown in Table 1.

TABLE 1

| | Example | | | |
| --- | --- | --- | --- | --- |
| | Application Examples | | Comparative Examples | |
| Characteristic | 1 | 2 | 1 | 2 |
| Viscosity (Pa · s) | 3.3 | 1.0 | 1.9 | 13.6 |
| Hardness | 70 | 65 | 65 | 68 |
| Tensile Strength (MPa) | 9.0 | 7.0 | 2.0 | 2.3 |

INDUSTRIAL APPLICABILITY

Since the curable silicone composition of the invention possesses excellent flowability and filling ability and can be prepared without exhibiting an extreme viscosity even if the composition contains resin-like organopolysiloxanes required to form a cured silicone body of appropriate strength and hardness, the composition is suitable for use as a sealant and a filler in the manufacture of electrical and electronic devices. In particular, when the cured body obtained from the curable silicone composition of the invention possesses transparency, it can be used as an optical material permeable to visible light, infrared light, ultraviolet light, far-ultraviolet light, X-rays, laser beams, etc.

The invention claimed is:

1. A curable silicone composition comprising at least the following components:
  (A) a diorganopolysiloxane having in one molecule at least two alkenyl groups;
  (B) at least two resinous organopolysiloxanes having a difference of at least 1,000 between their mass-average molecular weights as reduced into standard polystyrene measured by gel permeation chromatography wherein one of the at least two resinous organopolysiloxanes has a higher mass-average molecular weight relative to the other of the at least two resinous organopolysiloxanes, and the mass ratio of the higher mass-average molecular weight resinous organopolysiloxane to the lower mass-average molecular weight resinous organopolysiloxane is in the range of 50:50 to 10:90, wherein the at least two resinous organopolysiloxanes are composed of $SiO_{4/2}$ units, $R^1{}_2R^2SiO_{1/2}$ units, and $R^1{}_3SiO_{1/2}$ units, wherein $R^1$ is an optionally substituted univalent hydrocarbon group that is free of aliphatic unsaturated bonds and $R^2$ is an alkenyl group, and wherein component (B) has a mass-average molecular weight in the range of 100 to 10,000 and is used in the amount of 40 to 100 parts by mass per 100 parts by mass of component (A);
  (C) an organopolysiloxane that contains in one molecule at least two silicon-bonded hydrogen atoms, wherein the silicon-bonded hydrogen atoms contained in this component are used in the amount of 0.1 to 10 moles per one mole of all alkenyl groups contained in components (A) and (B); and
  (D) a hydrosilylation catalyst in a catalytic quantity.

2. The curable silicone composition of claim 1, wherein component (B) is composed of at least two resinous organopolysiloxanes having a difference of at least 1,500 between their mass-average molecular weights.

3. The curable silicone composition of claim 1, wherein component (B) is composed of at least two resinous organopolysiloxanes having a difference of at least 2,000 between their mass-average molecular weights.

4. The curable silicone composition of claim 1, wherein $R^1$ is a methyl or phenyl group.

5. The curable silicone composition of claim 1, wherein component (B) is free of hexenyl and cyclohexenyl groups.

6. The curable silicone composition of claim 1, wherein component (A) is selected from the group of a dimethylpolysiloxane capped at both molecular terminals with dimethylvinylsiloxy groups, a copolymer of methylvinylsiloxane and dimethylsiloxane capped at both molecular terminals with dimethylvinylsiloxy, a copolymer of methylphenylsiloxane and dimethylsiloxane capped at both molecular terminals with dimethylvinylsiloxy, methylvinylpolysiloxane capped at both molecular terminals with trimethylsiloxy, a copolymer of methylvinylsiloxane and a dimethylsiloxane capped at both molecular terminals with trimethylsiloxy, and combinations thereof.

7. The curable silicone composition of claim 1, wherein $R^2$ is a vinyl group.

* * * * *